(12) United States Patent
Waters, Jr.

(10) Patent No.: US 8,511,939 B2
(45) Date of Patent: Aug. 20, 2013

(54) SELF-ACTUATING STORM SURGE BARRIER

(75) Inventor: Louis A. Waters, Jr., Bellaire, TX (US)

(73) Assignee: Floodbreak, L.L.C., Houston, TX (US)

( * ) Notice: Subject to any disclaimer, the term of this patent is extended or adjusted under 35 U.S.C. 154(b) by 294 days.

(21) Appl. No.: 12/979,048

(22) Filed: Dec. 27, 2010

(65) Prior Publication Data

US 2012/0163916 A1 Jun. 28, 2012

(51) Int. Cl.
*E02B 7/14* (2006.01)
(52) U.S. Cl.
USPC ............... 405/112; 405/15; 405/63; 405/87; 405/96
(58) Field of Classification Search
USPC ............... 405/15–17, 21, 23, 26, 28, 63, 87, 405/107, 92, 94, 96, 99, 100, 101
See application file for complete search history.

(56) References Cited

U.S. PATENT DOCUMENTS

| | | | |
|---|---|---|---|
| 4,377,352 A | 3/1983 | Goodstein | |
| 4,787,774 A | 11/1988 | Grove | |
| 6,623,209 B1 | 9/2003 | Waters, Jr. | |
| 7,101,114 B1 | 9/2006 | Waters, Jr. | |
| 7,114,879 B2 | 10/2006 | Obermeyer | |
| 2003/0190193 A1* | 10/2003 | Waters, Jr. | ........... 405/110 |
| 2009/0220301 A1 | 9/2009 | Miyao et al. | |

FOREIGN PATENT DOCUMENTS

| | | | |
|---|---|---|---|
| GB | 2425559 | * | 1/2006 |
| JP | 2000319857 A | | 11/2000 |

* cited by examiner

*Primary Examiner* — Frederick L Lagman
*Assistant Examiner* — Carib Oquendo
(74) *Attorney, Agent, or Firm* — Tim L. Burgess, P.C.

(57) ABSTRACT

The shore side of a shore line water barrier is protected from flooding caused by storm surge over-topping the barrier. Water overtopping the barrier, such as from wind waves crashing against the barrier, is trapped, impounded and accumulated between a parapet atop the barrier and walls on the sides of a buoyant gate unit taller than the parapet and walls and normally resident below grade on the shore side of the barrier, hinged about an axis generally parallel to the barrier and spaced from the parapet by a distance not less than the height of the gate unit. The accumulated overtopping water is applied to rotationally float the gate unit from the horizontal position initially principally by buoyancy and then principally by hydrostatic pressure to drive the gate unit to an upright position to oppose storm surges having a water level higher than the parapet.

20 Claims, 9 Drawing Sheets

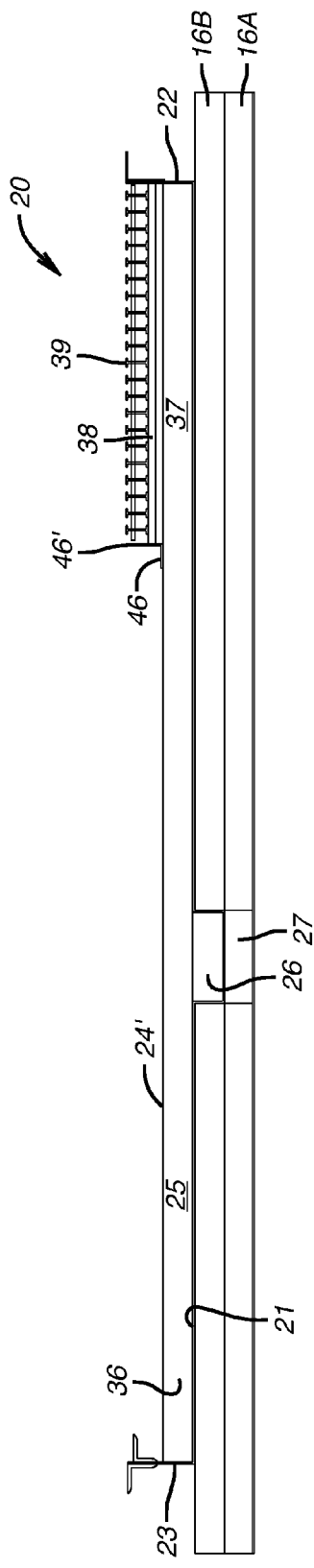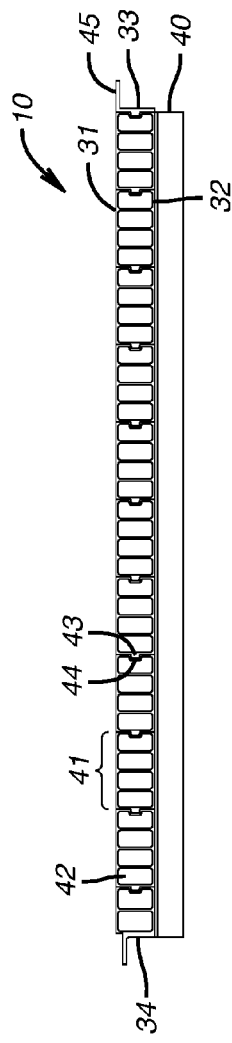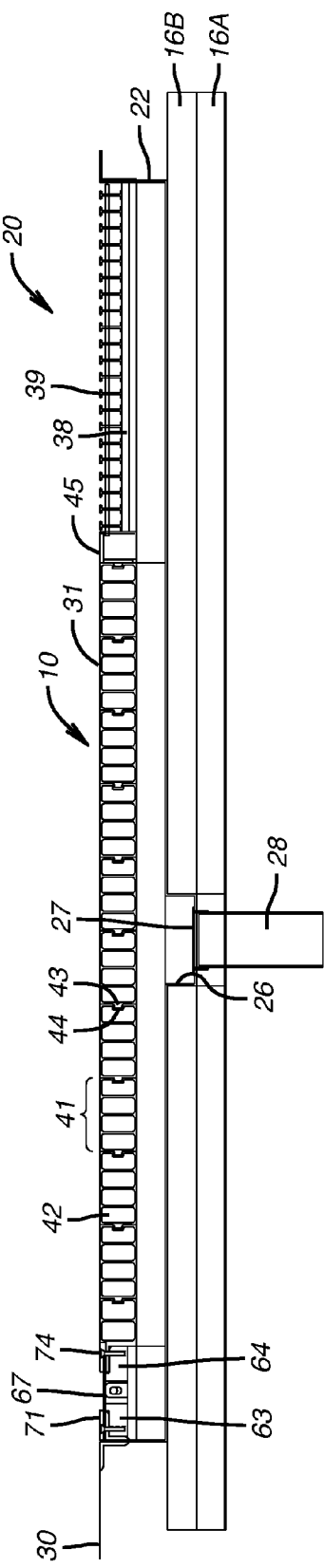

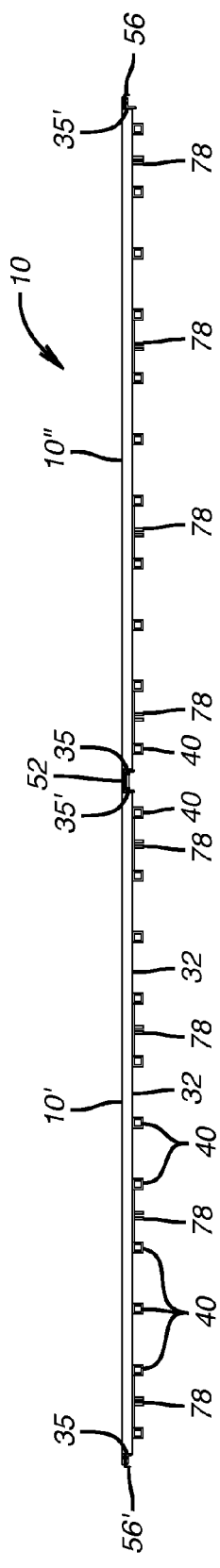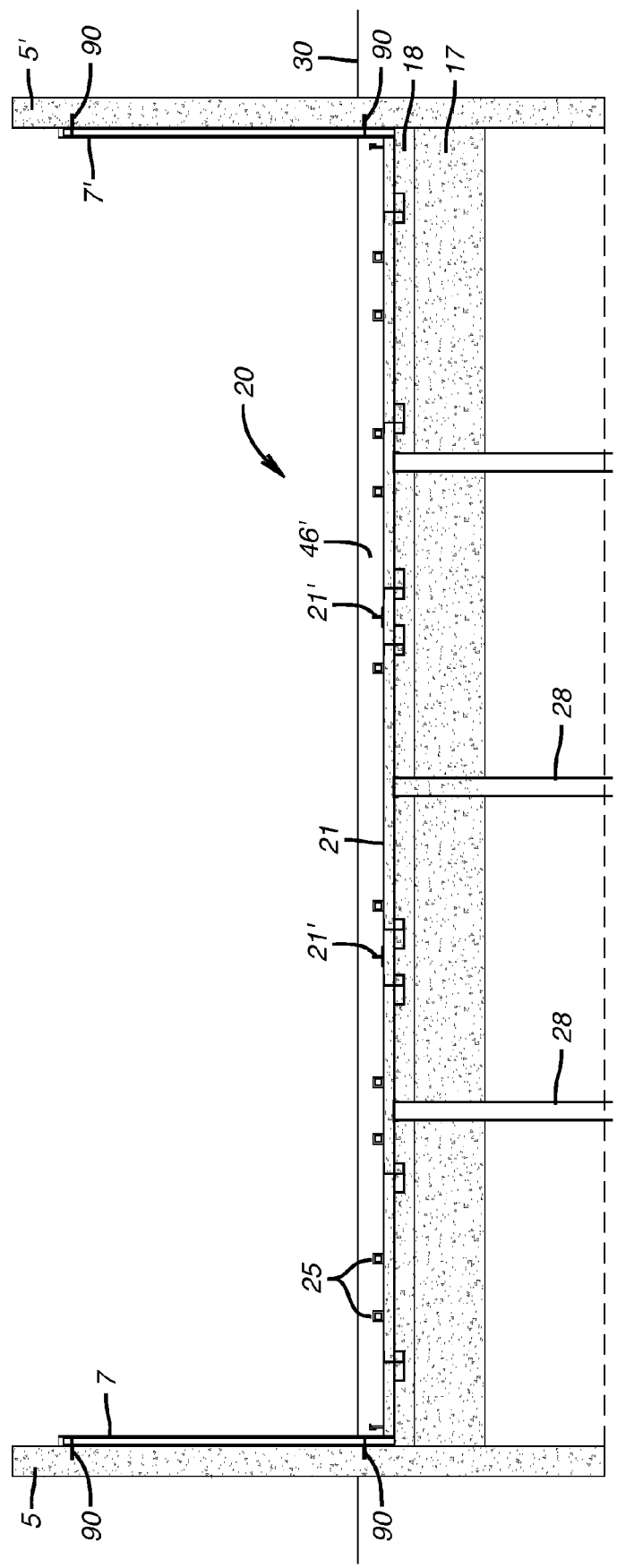

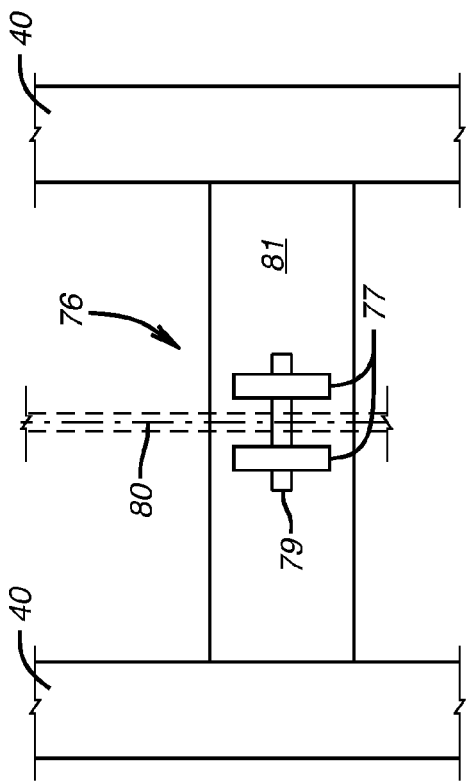
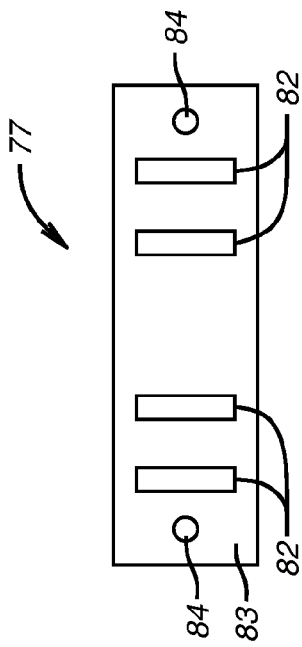
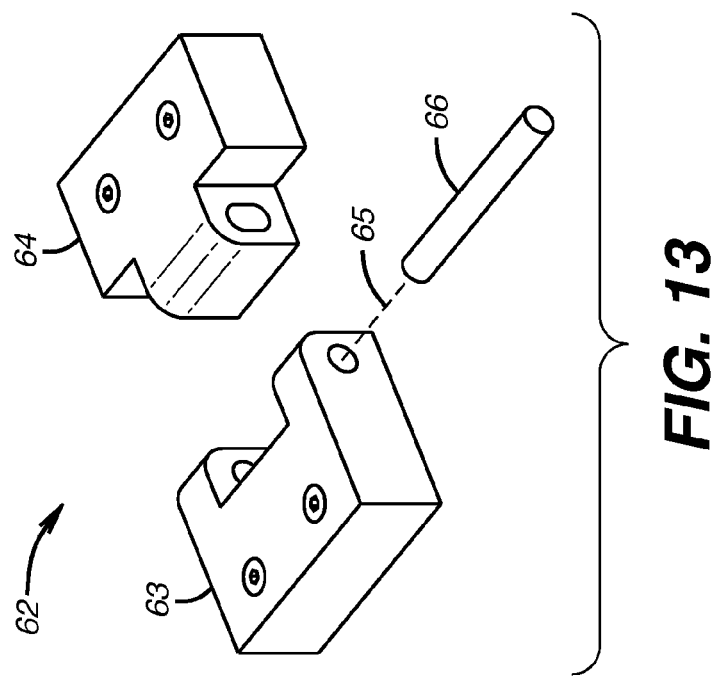

SELF-ACTUATING STORM SURGE BARRIER

STATEMENT REGARDING FEDERALLY SPONSORED RESEARCH AND DEVELOPMENT

Not Applicable

BACKGROUND OF THE DISCLOSURE

1. Field of Disclosure

This invention relates to coastal protection from storm surges to reduce coastal flooding.

2. Background

Flooding in coastal areas resulting from tropical storms, hurricanes, cyclones or typhoons produces death and destruction. Storm surge is the major cause of flooding. Storm surge is water that is pushed toward the shore by the force of the winds swirling around the storm. This advancing surge can combine with normal tides to create a storm tide, which can increase the mean water level 15 feet or more. In addition, wind driven waves are superimposed on the storm tide. A surge is not generally one hill of a high sea level; it generally is a series of ever growing hills of high sea levels.

Storm surge is particularly dangerous along coastlines that do not rise significantly above mean sea level, such as the densely populated Atlantic and Gulf Coasts of the United States that lie less than about 10 feet above mean sea level for miles inshore (mean sea level is halfway between mean high and low tides). Urbanized coastal areas often employ a shoreline wave barrier such as a bulkhead or seawall to prevent destruction of beachfront properties by wind driven waves. Galveston, Tex. installed a 17 feet tall concrete seawall, 16 feet wide at the base, and now ten miles long, after the great hurricane of 1900 that killed 6000 people and destroyed the city.

In September 2007, Hurricane Ike made landfall near the north end of Galveston Island. Storm surges of 15-20 feet above normal tide levels occurred along the Bolivar Peninsula of Texas and in much of the Galveston Bay area. At Sabine Pass east of Galveston Island, the storm surge was recorded at 22 feet above mean sea level. Preceded by large plunging waves breaking over the Galveston seawall, the ensuing storm surges overtopped the seawall, inundating the town. Property damage from Ike is estimated at approximately $10 billion with nearly 200 people killed.

As a result of the Ike catastrophe at Galveston, proposals (called the "Ike Dike") have been advanced to extend the Galveston seawall to 60 miles at the same height and to erect a flood gate—modeled from the Maeslantkering storm surge barrier across the Rotterdam channel in the Netherlands—to close off a nearly two mile stretch of open water between Galveston Island and Bolivar Peninsula to protect Galveston Bay from a storm surge. The cost of such a massive solution would be billions of dollars. However, even the existing Galveston seawall was overtopped by the Hurricane Ike.

Steel or concrete walls permanently installed atop wave barriers such as seawalls, bulkheads, dikes, or levees to prevent overtopping from storm surges offer a potential solution. However, permanent walls parallel to the shoreline and tall enough to block and withstand a storm surge obscure the view of the waterscape, mar the landscape of often-beautiful coastline areas, and impede recreational use of the beaches. U.S. Pat. No. 7,033,122 addresses this and describes a folded metal wall situated in an accommodation space in a dike that can be unfolded and locked in place by workers in advance of an anticipated storm surge. However this solution requires human intervention to erect, and men, machines and electrical power may not be available to erect the walls when the time comes, such as, for example, if workers are unable to get to assigned stations due to storm conditions or if mandatory evacuation has been instituted or if power outages have occurred rendering machines unworkable.

U.S. Pat. No. 6,338,594 describes protecting dikes from overtopping by vertically elevating buoyant walls from an underground chamber into which water is pumped to float the walls upwardly, but these kinds of solutions depend on expensive pumping stations and are susceptible to inoperability from power outages. Use of rising storm waters to fill underground chambers and buoy walls vertically upwardly atop a dike or bulkhead is described in U.S. Pat. Nos. 5,725,326 and 7,744,310. Riverbanks have been described lined by self-elevating stanchions using interconnected flexible sheeting between stanchions to provide a water containment barrier. See U.S. Pat. No. 4,377,352.

Doors and other grade level openings in a building or wall have been guarded from entrance of flooding water by self-actuating buoyant gates that require no power and rotate upwardly about a horizontal axis to barricade the opening against water. See U.S. Pat. No. 6,623,209, by the instant inventor.

Relatively inexpensive self-actuating buoyant gates that require no power and rotate upwardly, of the type taught in U.S. Pat. No. 6,623,209 by the instant inventor have not been used to protect land from storm surges that accompany a hurricane or tropical storm. A problem with use of a type of gate taught in U.S. Pat. No. 6,623,209 to relatively inexpensively protect against storm surge overtopping a wave barrier wall is that the rush and ebb of strong waves overtopping the barrier wall in advance of arrival of the series of storm surges is ineffective to raise and maintain the gate fully upright to oppose the storm surges. If overtopping water is enough to raise from horizontal, and even momentarily drive the gate relatively upright, the wave quickly recedes, pressure against the face of the gate drops drastically, and the gate falls down.

A low cost solution remains needed for bulkheads, seawalls, levees, dikes or other shore line water barrier walls susceptible to storm surge overtopping. The solution desirably is one that, without requiring human intervention or electrical power, erects a storm surge barrier at or on the shore line water barrier wall in advance of arrival of a storm surge, to protect the shore behind the shore line water barrier wall from flooding caused by a storm surge overtopping the shore line water barrier wall. The solution desirably would be one that, when not in use, does not block the view of the waterscape of the body of water lined by the bulkhead, seawall, levee, dike or other shore line water barrier wall.

BRIEF DESCRIPTION OF THE DRAWINGS

In the following detailed description of exemplary embodiments, reference is made to the accompanying drawings, which form a part hereof and in which are shown by way of illustration examples of exemplary embodiments with which the invention may be practiced. In the drawings and descriptions, like or corresponding parts are marked throughout the specification and drawings with the same reference numerals. The drawings are not necessarily to scale. Certain features of the invention may be shown exaggerated in scale or in somewhat schematic form and some details of conventional elements may not be shown in the interest of clarity and conciseness. Referring to the drawings:

FIG. 4 is a side sectional view of an example of a pan taken along the line 4-4 of FIG. 2 for an exemplary embodiment of FIG. 1.

FIG. 5 is a side sectional view of an exemplary embodiment of a gate panel comprising a gate taken along the line 5-5 of FIG. 3.

FIG. 6 is a side sectional view taken along the line 6-6 of FIG. 3, showing the gate of FIG. 5 disposed in the pan of FIG. 4.

FIG. 9 is an end sectional view taken along the line 9-9 of FIG. 3 showing two panels joined side-by-side to comprise an exemplary embodiment of a multi-panel gate of a construction of this invention.

FIG. 10 is an end sectional view taken along the line 10-10 of FIG. 2 of a pan for a multi-panel gate comprising two joined panels, also showing adjacent wiper walls and their lateral support walls in an exemplary embodiment of a construction of this invention.

FIG. 14 is an isometric view of an example of pivotation members for pivotation of the exemplary gate of FIG. 5 out of the exemplary pan of FIG. 4 for the construction of this invention.

FIG. 15 is an exemplary gate anchor for the gate in FIGS. 1 and 9.

FIG. 15 is an exemplary anchor for the pans seen in FIGS. 1 and 2.

DETAILED DESCRIPTION OF EMBODIMENTS

Figure 1:
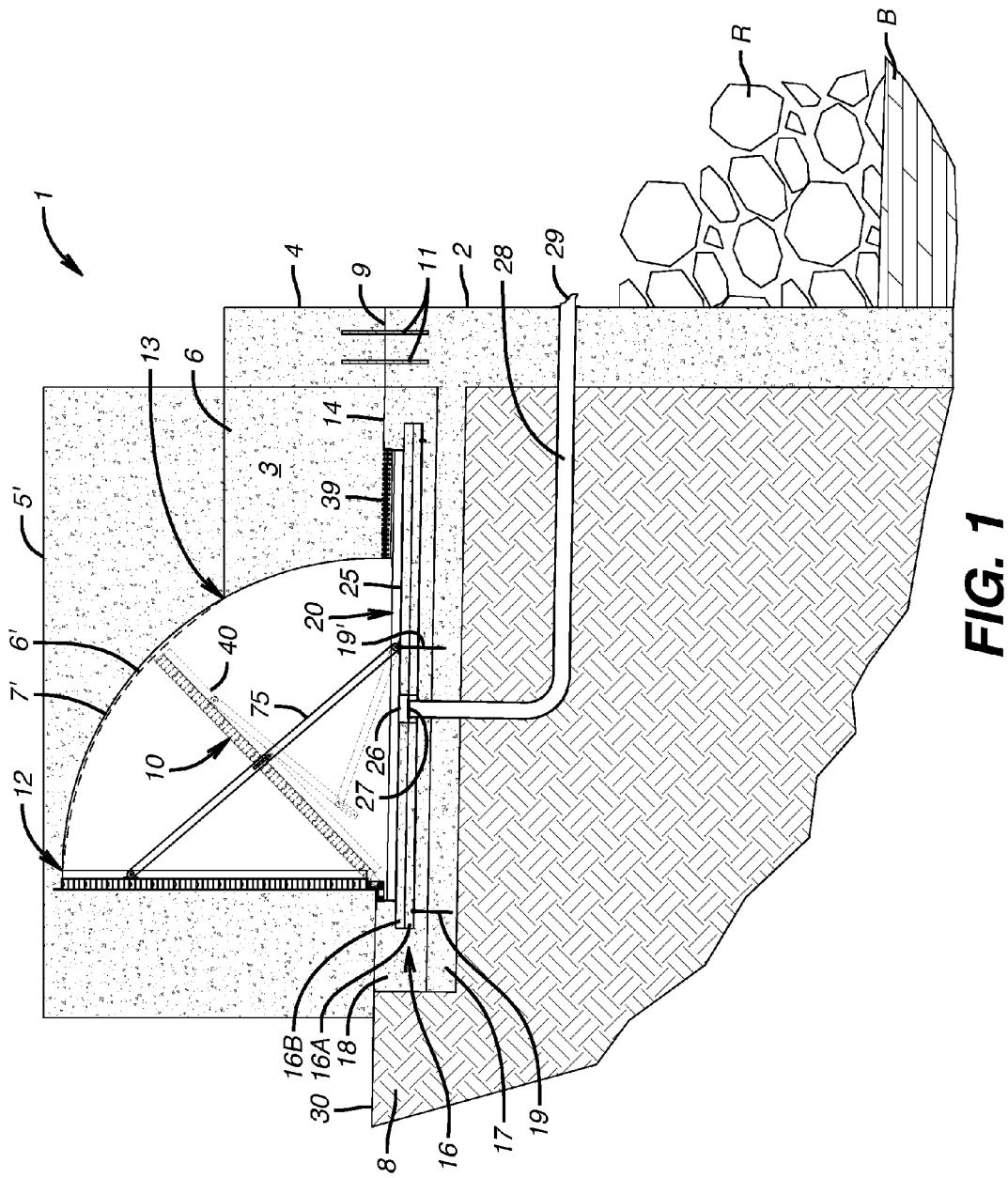
FIG. 1 is a side sectional view of an exemplary embodiment of the invention, showing a construction of the invention for protecting a coastal area from storm surge flooding.

Specific details described herein, including what is stated in the Abstract, are in every case a non-limiting description and exemplification of embodiments representing concrete ways in which the concepts of the invention may be practiced. This serves to teach one skilled in the art to employ the present invention in virtually any appropriately detailed system, structure or manner consistent with those concepts. Reference throughout this specification to "an exemplary embodiment" means that a particular feature, structure, or characteristic described in connection with the embodiment is included in at least one exemplary embodiment of the present invention. Thus, the appearances of the phrase "in an exemplary embodiment" in various places throughout this specification are not necessarily all referring to the same embodiment. Furthermore, the particular features, structures, or characteristics may be combined in any suitable manner in one or more embodiments. It will be seen that various changes and alternatives to the specific described embodiments and the details of those embodiments may be made within the scope of the invention. It will be appreciated that one or more of the elements depicted in the drawings can also be implemented in a more separated or integrated manner, or even removed or rendered as inoperable in certain cases, as is useful in accordance with a particular application. Because many varying and different embodiments may be made within the scope of the inventive concepts herein described and in the exemplary embodiments herein detailed, it is to be understood that the details herein are to be interpreted as illustrative and not as limiting the invention to that which is illustrated and described herein.

The various directions such as "upper," "lower," "back," "front," "transverse," "perpendicular", "vertical", "normal," "horizontal," "length," "width," "laterally" and so forth used in the detailed description of exemplary embodiments are made only for easier explanation in conjunction with the drawings. The components may be oriented differently while performing the same function and accomplishing the same result as the exemplary embodiments herein detailed embody the concepts of the invention, and such terminologies are not to be understood as limiting the concepts which the embodiments exemplify.

As used herein, the use of the word "a" or "an" when used in conjunction with the term "comprising" (or the synonymous "having" or "including") in the claims and/or the specification may mean "one," but it is also consistent with the meaning of "at least one" and "one or more than one."

In addition, as used herein, the phrase "connected" means joined to or placed into communication with, either directly or through intermediate components.

In accordance with this invention, a method and a construction is provided for protecting relatively inexpensively the shore side of a shoreline barrier from flooding by a storm surge overtopping the barrier. The shoreline barrier may be a seawall, bulkhead, levee, dike or other high water barrier protecting land fronting a body of open water. In the embodiments described, the shore line barrier is a seawall, but a shore protected by the method and construction of this invention need not face a sea, and may face coastal inlet waters such as a bay (for example, in Tex., Galveston Bay), or an inland lake opening to a sea (for example, in Tex., Sabine Lake), or an inland water course in communication with a bay or lake, such as the widened and deepened Buffalo Bayou that with widened and deepened channels of Galveston Bay form the Houston Ship Channel. Numerous terminals, berthings and petroleum refineries line the Houston Ship Channel vital to the national economy. The terminals and refineries are susceptible to flooding over bulkheads if waters from storm surges exceed about 10 feet from mean sea level.

The method and construction of this invention allows the use of embodiments of the type of gate taught in U.S. Pat. No. 6,623,209. The method comprises (i) providing adjacent the shore line barrier a normally horizontal buoyant gate rotatingly pivoting at a gate end distal from the barrier about an axis generally parallel to the barrier, (ii) trapping water overtopping the barrier, and (iii) impounding the water between the gate and the barrier to a depth producing a hydrostatic force against the gate effective to rotate the gate from a partially elevated position to a fully upright position.

The construction includes a water trap arranged at the shore side of the barrier and comprising a front wall contiguous with the barrier and a plurality of lateral walls connecting to the front wall, for entrapping storm water overtopping the front wall to form a pool behind the barrier.

The construction further includes a normally horizontal buoyant gate or gate unit inside the water trap and spaced from the front wall sufficiently to allow formation of a pool between the gate and the front wall. As used herein, the term "gate unit" may comprise a single buoyant panel or a plurality of buoyant panels connected side-by-side to form a single multi-panel unit, and the term gate" may comprise at least one gate unit and may be a plurality of gate units arranged in longitudinal series interspersed between lateral walls to act together as a single gate. The gate or gate unit comprises lateral sides, a front face on an underside thereof and a length spanning from an end distal to the barrier to an end proximal to the barrier. The gate or gate unit is rotatably pivotable from horizontal to a full upright position about an axis at the distal end. The pivotation axis is generally parallel to the barrier. In upright position, the length of the gate or gate unit is the height of the gate or gate unit. Reference herein to the height of a gate or gate unit will be understood to correspond to a distance about equal to the length of the gate, allowing variance for mounting hardware and similar adjustments.

The front wall of the water trap has a height operable in concert with the lateral walls to impound storm water overtopping the front wall to form a pool behind the shoreline barrier having a minimum depth. This depth is a depth sufficient to produce a hydrostatic pressure, impressible on the face of the gate—after the gate or gate unit is rotatingly buoyed partially upward from horizontal by water accumulating in the water trap—effective to rotate the gate or gate unit to a fully upright position.

When overtopping storm waters are trapped in the water trap, initially a buoyant force equal to the weight of water displaced by the gate pushes the underside of the gate or gate unit facing the water (the front face of the gate) rotationally upwardly about the pivotation axis against the force of gravity. As the gate or gate unit inclines upwardly, the moments of the gravitational force normal to the topside of the gate or gate unit (the back face of the gate or gate unit) grow smaller and angular moments of the gravitational force develop and begin to orient in a direction approaching more parallel to the face of the gate or gate unit and against the pivotation axis. In consequence, the gravitational forces begin to exert less resistance to the buoyancy forces. As rise of the gate or gate unit continues, the hydrostatic pressure of the water pressing against the front face of the gate or gate unit increases and contributes more and more to pushing against the front face of the gate or gate unit as at the same time smaller and smaller moments of the gravity forces are acting against the back face of the gate or gate unit and more and more moments of the gravitational force are borne by the pivotation members. Eventually the hydrostatic pressure of water pressing against the front face of the gate or gate unit surpasses the buoyancy forces and overcomes the gravitational forces, and the gate or gate unit is pushed to an upright position. In the vertical position, gravity forces are parallel to the face of the gate or gate unit and normal to the pivotation axis. The buoyancy forces are parallel to the face of the gate or gate unit, essentially normal to the pivotation axis and opposing the gravitational force. Hydrostatic pressure normal to the face of the gate or gate unit holds the gate or gate unit upright.

There is a minimum of two lateral walls of the water trap. These two lateral walls are laterally adjacent the sides of lateral sides of every gate or gate unit. In the instance of gate comprising a single panel gate or a single multi-panel gate, the two lateral walls are end walls of the water trap. These lateral end walls have a height at least about as tall as the height of the gate unit in the full upright position for preventing storm surge water higher than the height of the front wall, as high as the height of the gate unit and potentially higher depending on the height of the lateral wall, from flowing around the lateral sides of the upright gate unit. In the instance of a plurality of single panel gates arranged in longitudinal series interspersed between lateral walls or a plurality of multi-panel gate units arranged in longitudinal series interspersed between lateral walls, there are two lateral end walls and, in additional, at least one intermediate lateral wall, as further described below.

In an exemplary embodiment involving a plurality of single panel gate units or multi-panel gate units arranged in longitudinal series interspersed between lateral walls, the lateral walls connecting to the front wall include at least one intermediate lateral wall located between the end walls. A first gate unit is located between one end wall and a next adjacent intermediate lateral wall, and a second gate unit is located between the other end wall and a next adjacent intermediate lateral wall. If there are more than two gate units, they are located between adjacent intermediate lateral walls.

In an exemplary embodiment in which the gate comprises a series of gate units arranged in longitudinal series interspersed between lateral walls, each intermediate lateral wall has a height at least as high as a top profile having an arc at least as high as the arc described by the distal end of the gate unit as it rises from horizontal to vertical. The top of the arc corresponds to the place on the intermediate lateral wall that is adjacent to where the gate is in full upright position. This height throughout the profile prevents storm surge water higher than the height of the front wall from passing through adjacent gate units during the rise of gate units and when the gate units are fully upright. Thus the intermediate lateral gates may have a height as tall (or taller) than the end walls but are not required to, and may have the lesser heights of the profile described. In any event, the height of the portion of the intermediate wall connecting to the front wall and joining the portion adjacent the arc described by rise of the gate unit must have a height at least as high as the height of the front wall.

The portion of the lateral walls of the water trap adjacent the arc described by rise of the gate unit may be wiped by the lateral sides of the rising gate unit. The lateral sides of the gate unit may mount a wiping seal. The lateral walls of the water trap may have a smooth surface, for example, polished granite, stainless steel or aluminum that may be wiped by the wiping seal. In an exemplary embodiment, the lateral walls of the water trap may comprise a support wall and at least one supplemental wall fastened on one side of the support wall to provide a wiping surface. The supplemental wall may have a smooth surface allowing the support wall to be rough. Thus a lateral end wall may comprise a support wall and one wiper wall fastened on the side of the support wall adjacent the gate unit. An intermediate lateral wall may comprise a support wall and a pair of wiper walls, one wiper wall attached to each lateral side of the support wall. Use of a supplemental wiper wall is optional. Thus, a lateral wall may comprise only a wall for wiping or may comprise a support wall and a wiper wall.

In an exemplary embodiment, the front wall of the water trap has a height above shore grade at the shore line water barrier of at least from about ⅓ to about ½ the height of the gate when the gate is fully upright.

At a depth of water impounded by the water trap of from about ⅓ to about ½ the length of the gate (the height of the gate when the gate is fully upright), the curve of buoyant and hydrostatic forces described above overcomes the weight of the gate that resists rise of the gate, and a predominantly hydrostatic force drives the gate to a fully erect position. The precise location along the curve of buoyancy, gravity and hydrostatic moments of force where the force of gravity is overcome depends at least in part on the total weight, displacement and size of the gate (density=mass per unit volume). For an 8 feet tall gate constructed as described below for specific exemplary embodiments of a gate, and placed adjacent a 17 foot seawall, giving a total 25 feet of barrier protection against a storm surge, the height of the water trap comprising the front wall of the water trap contiguous with the seawall suitably is about 3-4 feet above shore side grade at the seawall. This low rise height both is effective to create the necessary depth of trapped and impounded water to overcome the gravitational forces resisting rise of the gate, and provides the additional benefit that it is low enough not to block the view of the waterscape from onshore when the gate is in its normally horizontal position.

A height of the front wall of the water trap taller than that which is effective to impound water to a depth causing the buoyant gate to rotate to a full upright position serves little additional purpose consonant with the instant invention but may be done for other reasons and still be within the scope of the invention, as a taller height includes the lower effective height.

The methods and constructions employed in the exemplary embodiments described hereinafter overcome the above-mentioned problem that made problematic the use of a relatively inexpensive floodgate such as taught in U.S. Pat. No. 6,623,209 to combat storm surges. The methods and constructions employed in the embodiments described hereinafter do not allow overtopping storm water to run off and dissipate when an overtopping wave recedes. Instead, the overtopping water is impounded in a pool created between the front of a buoyantly rising gate unit, a pair of lateral walls and the front wall of the water trap. Thus any rise of the gate caused by a preceding overtopping wave is sustained until the next supplemental addition of overtopping water to the impound raises the level and increases the depth of the pool. Each succeeding higher level of impounded water pivotingly buoys the gate further upwardly, until eventually a minimum depth of impounded water is reached that produces sufficient hydrostatic pressure to overcome the weight of the gate and cause the gate to rise to a full upright position. The gate is kept in fully upright position because the pool of trapped and impounded water remains at least at the level that caused the gate to fully rise, and this level continues to press against the face of the upright gate.

Referring now to the drawings, the foregoing general descriptions of embodiments of the invention are supplemented by specific descriptions of exemplary embodiments. Reference numeral 1 in FIG. 1 generally indicates an exemplary embodiment of a construction for protecting the shore side of a shoreline water barrier wall 2 from flooding due to a storm surge surmounting the barrier. The view of FIG. 1 is a cross sectional view transverse to the barrier wall 2.

Construction 1 in part comprises a water trap 3 arranged at the shore side of barrier wall 2. Water trap 3 comprises a front wall 4 and a plurality of lateral walls. Two lateral walls are seen in FIG. 1, a lateral end wall 5' (of a pair of end walls 5, 5') and an intermediate lateral wall 6. Lateral intermediate wall 6 and lateral end walls 5, 5' are connected to front wall 4. In an exemplary embodiment, lateral intermediate wall 6 comprises a support wall portion 6' and a wiper wall 7' fastened on at least one lateral side of support wall 6', thereby indirectly connecting wiper wall 7' to front wall 4. Wiper wall 7' is next adjacent a lateral side 35' (FIG. 9) of a gate unit 10.

A normally horizontal, upwardly rotatable buoyant gate unit 10 resides inside the water trap boundaries defined by front wall 4 and lateral wall 6 and another lateral wall not seen in FIG. 1 because the view is cross sectional. See lateral end wall 5 in relation to lateral intermediate wall 6 in FIG. 16. Because FIG. 1 shows an intermediate lateral wall 6, the reader will understand from the foregoing general description of embodiments that there is another gate unit 10 (not seen) on the other side of intermediate lateral wall 6. That other gate unit will be bounded by another lateral wall, which may be either another intermediate lateral wall 6 or lateral end wall 5'. Thus FIG. 1 will be understood to present a plurality of gate units 10 arranged in longitudinal series interspersed between lateral walls. At least one intermediate lateral wall 6 is located between end walls 5, 5', a gate unit 10 is located between one end wall 5 and a next adjacent intermediate lateral wall 6 (reference FIG. 16), and another gate unit 10 is located between the other end wall 5' and a next adjacent intermediate lateral wall (which may be intermediate lateral wall 6 or another intermediate lateral wall not seen). Lateral end walls 5, 5' have a height at least about as tall as the height of gate 10 (in FIG. 1, a little taller) for preventing storm surge water higher than the height of the front wall from flowing around the lateral sides of the upright gate.

Intermediate lateral wall 6 has a height at least about as tall as the length of gate 10 at least at the top of a profile of an arc described by rise of gate unit 10 at a place on intermediate lateral wall 6, generally indicated by reference numeral 12, that is adjacent to where the gate is in full upright position. As mentioned above, this prevents storm surge water higher than the height of front wall 4 from passing through adjacent gate units 10. In an exemplary embodiment in which intermediate lateral wall 6 comprises a support wall 6' and a wiper wall 7' (reference FIGS. 1 and 16), support wall 6' and wiper wall 7' will have the top height 12. In the exemplary embodiment schematically depicted in FIG. 1, support wall 6' has a lesser height, for example, as at 13, distal to the height at 12. Lesser height 13 is at least as high as the height of the front wall 4. The profile contour of support wall 6' supplies support to wiper wall 7'.

Figure 16:
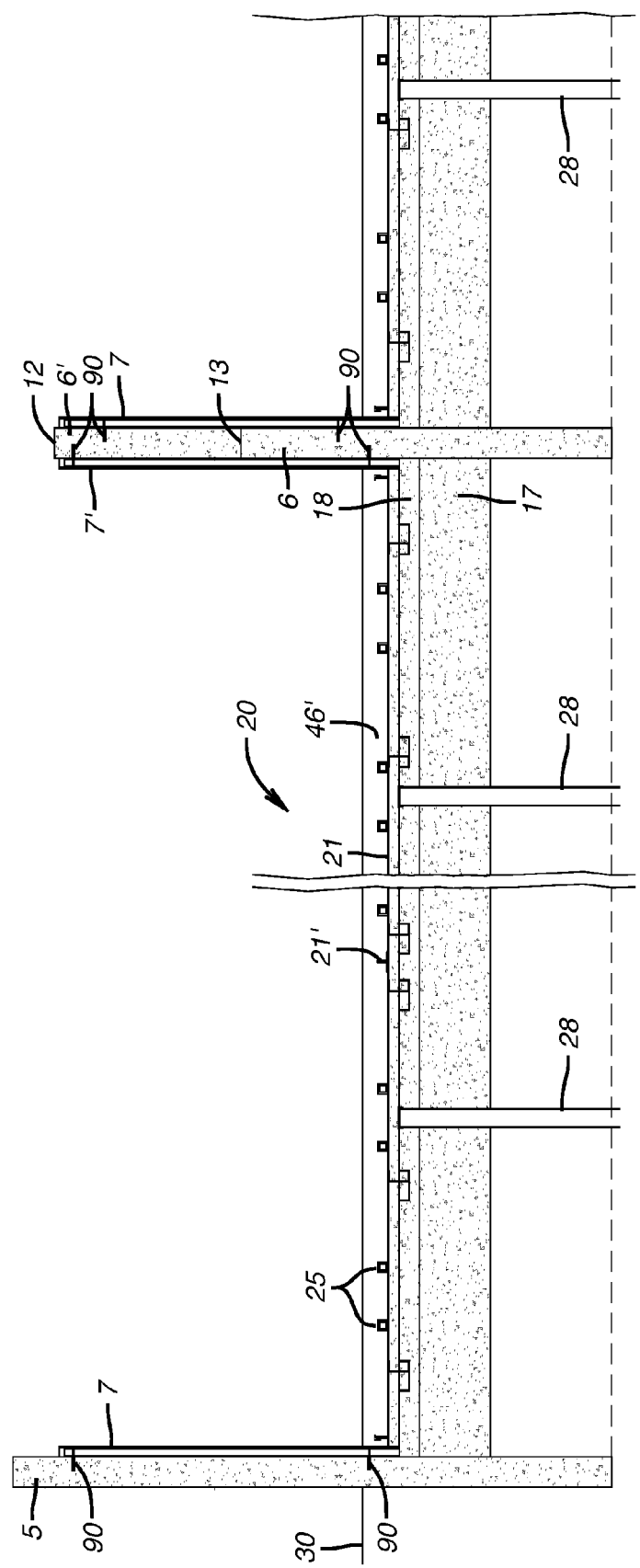
FIG. 16 is an end sectional view the same as FIG. 10 showing end and intermediate lateral walls and wiper walls in an exemplary embodiment of a construction of this invention.

Referring to FIG. 16, lateral wall 5 provides a first end wall in a construction 1 comprising a plurality of single multi-panel gate units 10 arranged in longitudinal series interspersed between lateral walls to form a unitary gate 10. Another lateral wall 5' provides a second end wall to the series (see also FIG. 1). At least one intermediate lateral wall 6 is located between lateral end walls 5, 5'. A first single multi-panel gate unit 10 would be located between first end wall 5 and next adjacent intermediate wall 6, and a second single multi-panel gate unit 10' would be located between second end wall 5' and a next adjacent intermediate lateral wall, in FIG. 16, intermediate lateral wall 6.

Figure 3:
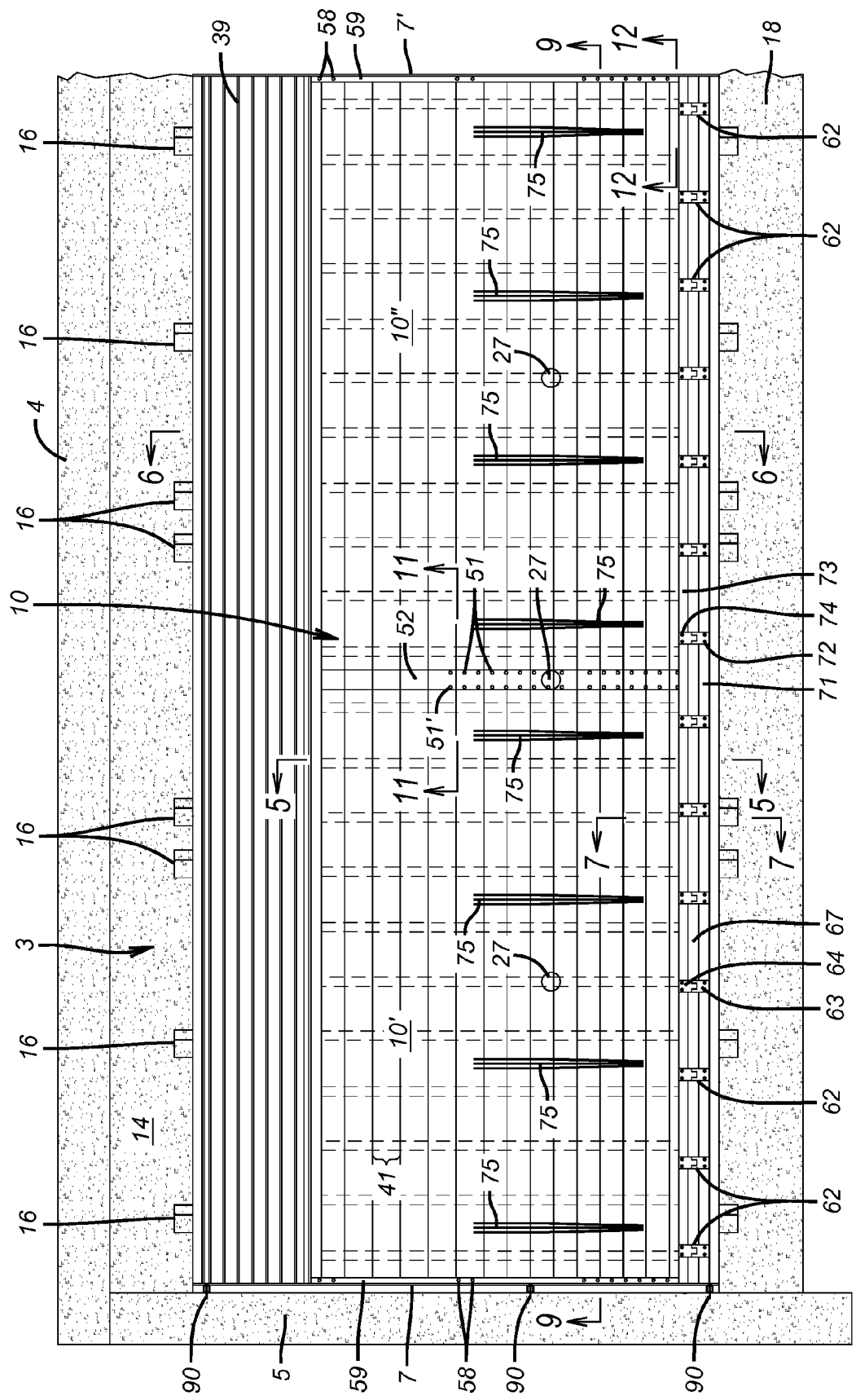
FIG. 3 is a top plan view of an exemplary gate for the construction of this invention.

Referring to FIGS. 3 and 10, in an exemplary embodiment, wiper walls 7, 7' are indirectly connected to front wall 4 by being anchored, as by bolts 90, to lateral end walls 5, 5', and referring to FIG. 16, similarly, to intermediate lateral wall 6 at support potion 6'. In an exemplary embodiment, wiper walls 7, 7' comprise aluminum walls having a smoother wiping surface than support end walls 5, 5' and any intermediate support walls 6. In this embodiment, wiper walls 7, 7' are proximately adjacent opposite sides 35, 35' of single multi-panel gate units 10 and are spaced from one another a distance accommodating the width of a multi-panel gate unit 10. In the context of a single panel gate, the lateral sides of the gate will be understood to be sides 35, 35'. In the context of a plurality of panels connected side 35' by side 35 as describe hereinabove in an example for connections for a multi-panel gate unit 10, sides 35, 35' will be understood to be the outermost sides of the gate respectively adjacent wiper walls 7, 7'.

In the exemplary embodiments schematically depicted in FIGS. 1, 3, 5 (and 6), 9 and 11, gate unit 10 comprises a single multi-panel gate unit, of which a section of one panel of multi-panel gate unit 10 is seen in FIGS. 1 and 5 (and 6). Gate unit 10 comprises lateral sides 35, 35', an underside face 32 and a length spanning from an end 34 distal to seawall barrier 2 to an end 33 proximal to seawall barrier 2.

Figure 8:
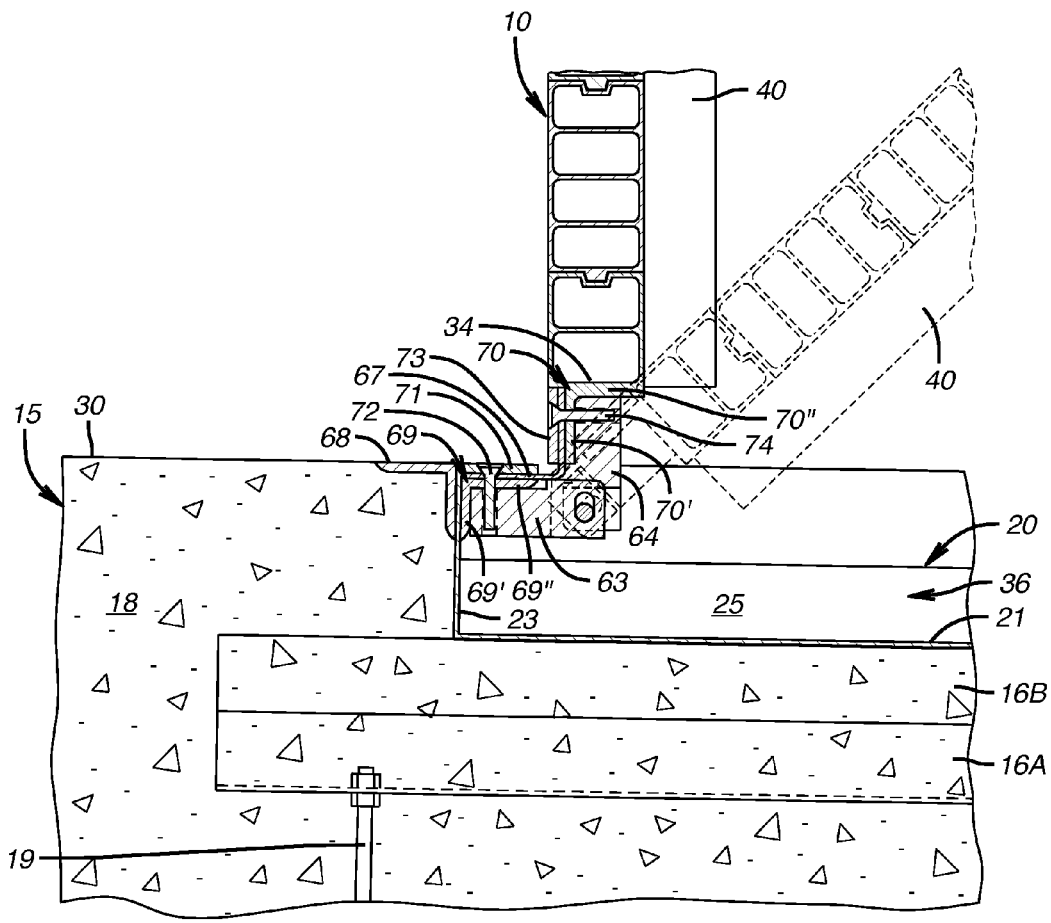
FIG. 8 is a side sectional view similar to the sectional line of FIG. 7, enlarging a portion of the view of FIG. 1 showing rise of the gate of FIG. 5 from the pan of FIG. 4.

Front wall 4 has a height operable in concert with the lateral walls to impound storm water overtopping front wall 4 to a minimum pool depth, as explained above. This is a pool depth sufficient to produce a hydrostatic pressure, impressible on the underside face 32 of gate 10 after the gate is rotatingly buoyed partially upward from horizontal, effective to rotate the gate to a fully upright position. FIGS. 1 and 8 show the rotation upward in partially dashed lines, and show the full upright position too.

Water trap front wall 4 is contiguous with barrier 2, and in an exemplary embodiment, is a parapet 4 atop barrier wall 2. In the exemplary embodiment depicted in FIG. 1, barrier wall 2 is a seawall bulk heading a ground 8 on a shore side of the seawall. In FIG. 1, parapet 4 is the portion of barrier wall above the demarcation line 9. In a new construction, parapet 4 is integrally poured with the seawall. For an existing seawall, parapet 4 may be joined to the existing seawall 2 by dowels 11 in a manner known to those skilled in the construction arts. For further context shown in FIG. 1, the seaside of a seawall typically has a beach "B" and often rip rap "R" protecting the base of the seawall. The seawall depicted is schematically vertical but may be a curved base seawall, and the riprap may provide a proxy for a curved base.

Figure 2:
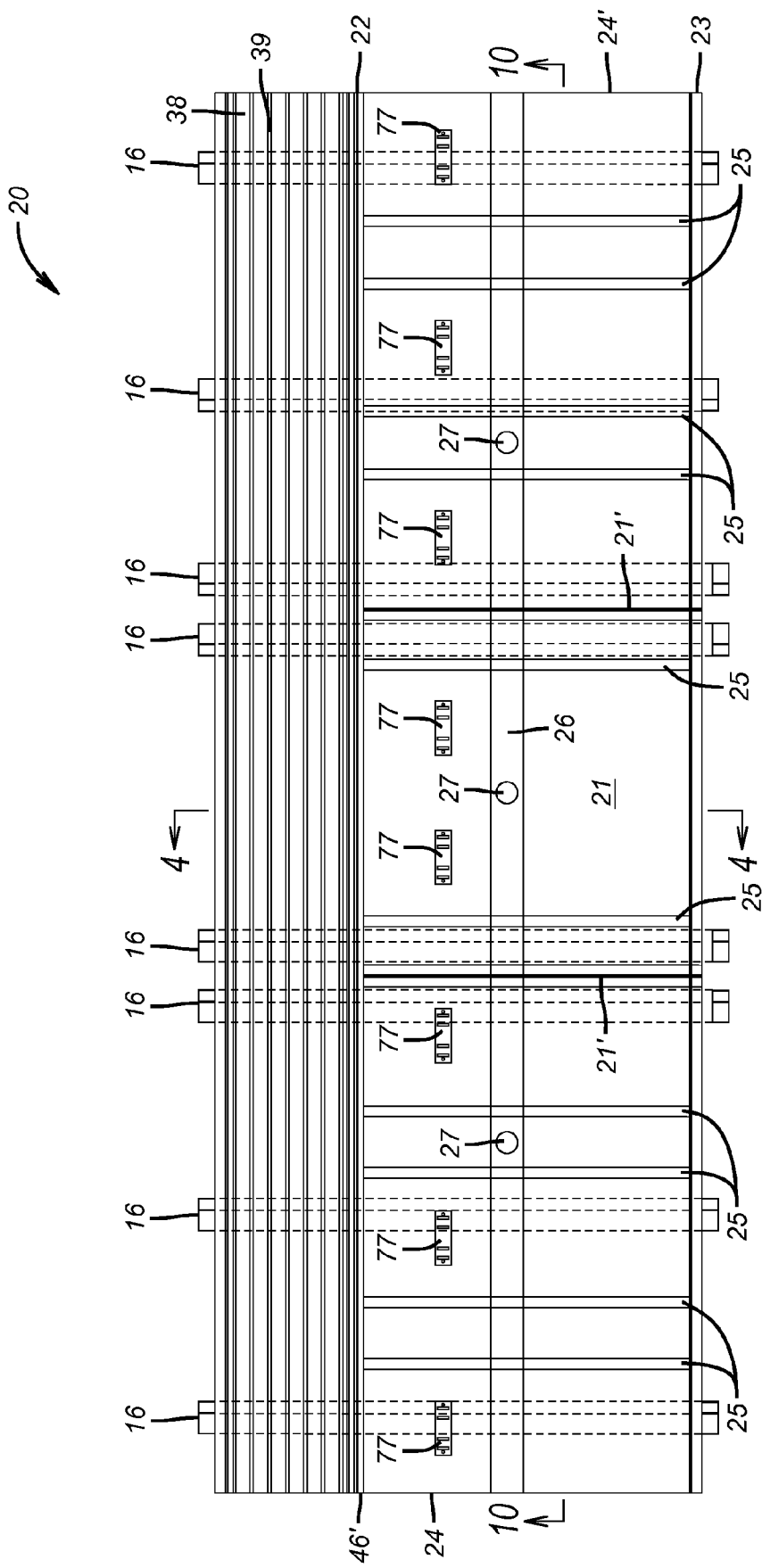
FIG. 2 is a top plan view of an exemplary pan for an exemplary pan for the construction of this invention.

Referring to FIGS. 1 and 3, in an exemplary embodiment, a single multi-panel gate unit 10 is housed in a pan 20 at the base 14 of parapet 4. Pan 20 is spaced from parapet 4 a distance sufficient to allow a pool of water to form behind parapet 4 in front of pan 20. Referring to FIGS. 3 and 10, in an exemplary embodiment pan 20 is between wiper walls 7, 7' connected via lateral end walls 5, 5' to parapet 4. Referring to FIGS. 2, 4, 10 and 16 in conjunction with FIG. 1, in an exemplary embodiment, pan 20 for housing a single multi-panel gate unit 10 has a bottom 21 comprising a plurality of panels having lateral panel ends upturned, pinched and seam welded at 21', a fore end 22 adjacent parapet 4, a back end 23, and a width bounded by lateral sides 24, 24'. Pan 20 is anchored to a concrete foundation 15 comprising a lower, first pour seal slab 17 and a second pour slab 18 in ground 8 on the shore side of the seawall. Referring to FIGS. 1, 2, and 10, horizontal channels 16A tee from vertical flanges 16B fixed to pan bottom 21. Channels 16A fill with concrete and embed in upper slab 18 in the second pour, providing anchors 16 running normal to a pivotation axis 65 described below. This is parallel to an expected direction of a storm surge. Channel 16A set hardened in upper slab 18 is further anchored to lower first pour slab 17 by anchor bolts 19.

Gate unit 10 when upright resists the full hydrostatic pressure from a mass of water of a storm surge that, acting on gate unit 10 would tend to lever pan 20 from ground 8 in the direction of flow of the surge. The pan anchors 16 in second slab 18 running parallel to an expected direction of a storm surge provide greater resistance to those leveraging surge forces than would the same anchors running parallel to the pivotation axis. Gate unit 10 is kept vertical against the storm surge by tensioning retention arms 75 described below. Retention arms 75 are anchored to the bottom 21 of pan 20, and pan 20 is additionally anchored against the storm surge leverage, by anchor bolts 19' that extend into the lower seal pour concrete slab 17 from retention arm anchor pan mounts 77 secured to pan bottom 21, more particularly describe below.

Suitably, lower seal slab 18 in ground 8 is tied into seawall 2, by well-known means, such as by dowels or, if slab 18 is a pre-existing sidewalk or vehicular street adjacent seawall 2, by ties pre-existing the installation of construction 1.

The particular manner in which pan 20 is secured to ground 8 will vary by site, and the manner shown is exemplary and non-exclusive. If tensioning members, for example, retention arms 75, are the restraints employed to maintain gate unit 10 in an erect vertical position, the manner of anchoring pan 20 should be robust enough to withstand the force of storm surge water pressing against gate unit 10 in its erect position.

Referring to FIGS. 1, 2, 4, 6, and 10, pan 20 includes a pan drainage system comprising one or more horizontal troughs 26 draining into one or more openings 27 for connection to one or more passages 28 to outlets 29 on the seaside of seawall 2 below parapet 4. Outlets 29 are lower in elevation than opening(s) 27 in pan 20. Ordinarily, outlets 29 will be higher than the normal high tide on the seaside of seawall 2. In these exemplary embodiments, as best seen in FIGS. 2, 4 and 6, trough 26 is substantially parallel to pivotation axis 65 described below. A purpose of troughs 26, openings 27, passages 28 and outlets 29 is to drain water, impounded as described above between gate unit 10, lateral end walls 5, 5' (in an embodiment having a plurality of gate units 10 interspersed between lateral walls, also at least one intermediate lateral wall 6) and parapet 4, back to the sea side of seawall 2 after a storm surge has receded and the water level on the sea side of seawall 2 is lower than outlets 29. When water against the face of the gate recedes, the force holding gate unit 10 vertical is reduced, and moments of the force of gravity begin to grow in a direction normal to the back face of the gate. Hydrostatic pressure yields to buoyancy forces in opposition to gravity, until eventually, the gate resumes its horizontal position in the recess.

Another purpose of troughs 26, openings 27, passages 28 and outlets 29 is to preload the pan drainage system to potentiate elevation of gate unit 10 as a result of collection and impound of overtopping waves smashing against seawall 2. During a violent wind storm such as a hurricane or tropical storm where the peaks of waves are breaking over the seawall 2, if the troughs of the breaking waves are higher than outlets 29, water can course from openings 29 upwards through passages 28 and potentially into pan 20 depending on the relative elevation of the wave troughs above outlets 29. This will prevent drainage of water from pan 20 through openings 27 and passages 28 to the sea side of seawall 2 and will preload construction 1 for the impound of water described above. The cross sectional areas of the openings 27, passages 28 and outlets 29 can be adjusted for a particular construction 1 to increase or retard the passage of water therein and therethrough to fine tune the collection of water by the water trap of construction 1 so as not to raise the gate 10 earlier than may be desired in a particular location.

Pan 20 may be slightly sloped toward parapet 4 to facilitate drainage. For example, for an 8 feet tall gate 10, the slope may be about 3 percent, or about 3 inches from back end 23 to fore end 22 of pan 20.

A plurality of support pan beams 25 traverse bottom 21 of pan 20 from back end 23 to fore end 22 spanning over trough 26. Pan beams 25 contribute to support of buoyant gate 10 when gate unit 10 is horizontally disposed in pan 20.

Referring to FIGS. 1, 3, 5-9, and 11-12, a single panel gate unit or single multi-panel gate unit 10 comprises a topside 31, an underside 32, a fore end 33, a back end 34 and a width bounded by lateral sides 35,35'. Each gate unit 10, normally horizontally disposed, is sized to fit and reside in pan 20 with underside 32 of the gate unit spaced above bottom 21 of pan 20 to allow admittance of water in unoccupied portions of space 36 under the gate unit. A plurality of support gate beams 40 are affixed to the underside 32 of the gate unit from the back end 34 to fore end 33 and occupy a portion of space 36 when gate 10 is horizontally disposed in pan 20. Support gate beams 40 are displaced laterally from support pan beams 25 so that they non-interferingly occupy space 36 and cooperatively contribute to support of gate 10 above space 36 in pan 20. Support of a gate unit in pan 20 by pan beams 25 and gate beams 40 especially allows the gate unit to be vertical weight bearing in normal horizontal disposition in the pan so that the gate unit may serve foot traffic atop it and provide a sidewalk adjacent parapet 4 and seawall 2. Flange 45 at the fore end 33 of a gate unit rests on a vertical portion 46' of flange 46 affixed to a top ledge of lateral sides 24, 24' at the fore end 22 of pan 20 when the gate unit is horizontally disposed in pan 20, providing supplemental support to beams 25 and 40.

Single panel gate or single multi-panel gate unit 10 occupies pan 20 above space 36 except a portion 37 at the fore end 22 of pan 20. Fore end portion 37 unoccupied by a gate unit 10 opens upwardly providing an entrance 38 through which wave water breaking over parapet 4 from waves smashing against parapet 4 is admitted into pan 20. Entrance 38 is guarded by a grate 39 atop the entrance. Water admitted through entrance 38 runs into the unoccupied portions of space 36.

The exemplary embodiments shown in FIGS. 4-8 depict a section of a single panel of a single multi-panel gate unit such as shown in FIGS. 1, 3, 9 and 11. In an exemplary embodiment, a panel may be made of a plurality of repeating assembly units 41 comprising hollow tubes 42, for example, tubes rectilinear in cross section, connected, for example, by stitch welding, along the length of a tube 42. In an exemplary embodiment, assembly units 41 non-limitingly comprise units of four connected tubes 42 and units of two connected tubes 42. Each assembly unit 41 has a rib 43 along the length on one outer tube 42 and a groove 44 along the length of the other outer tube 42. Assembly units 41 are joined rib 43 of one unit 41 into groove 44 of a next adjacent unit 41 and the rib in groove joints are groove welded. The cross sectional dimensions of the tubular components 42 of an assembly unit 41, and the number and mix of assembly units 41 used to build up a gate panel, determine the height of the gate unit 10, which suitably, for a parapet 4 of height 3-4 feet above shore side grade 30, may be at least one multiple of the parapet height, for example, 8 feet tall. The length of the tubes 42 determines the width of a panel of a gate unit 10. For example, tubes 42 may be 16 feet long, and in this example, a panel of gate unit 10 therefore may be 8 feet tall and 16 feet wide.

Referring to FIGS. 3 and 9, an exemplary embodiment of a single multi-panel gate or gate unit 10 is depicted. Multi-panel gate or gate unit 10 comprises a plurality of buoyant panels 10', 10" connected side-by-side for rotation about a pivotation axis 65 described below. Two panels 10', 10", connected side-by-side, are depicted for purposes of illustration; however, the term "plurality" in the phrase "a plurality of buoyant panels" is not restricted to a meaning of two, and as conventional and as in occurrences of the word "plurality" elsewhere herein, "plurality" means at least two, that is, two or more than two. The number of panels connected side-by-side determines the total width of a single multi-panel gate or gate unit 10. The number of panels may differ among gate units. In the example given above, where a panel is 16 feet wide, a single multi-panel gate of two panels would be about 32 feet wide, a single multi-panel gate of three panels would be about 48 feet wide, and so on, allowing for the connecting means used for connecting the panels.

Figure 11:
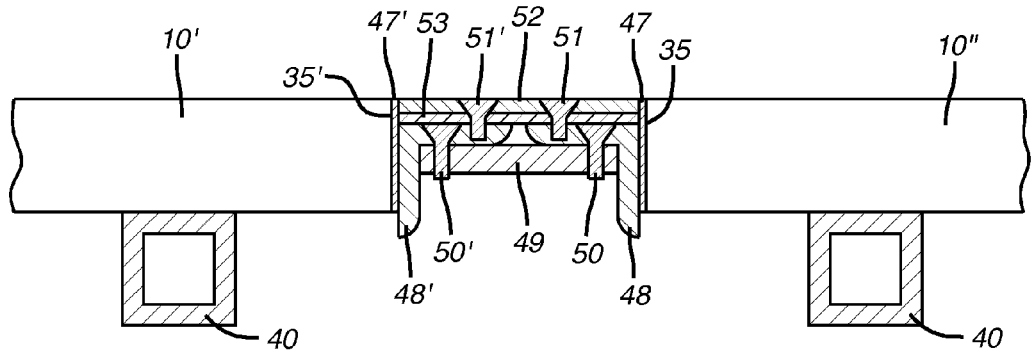
FIG. 11 is an end sectional view taken along the line 11-11 of FIG. 3 of a connection joining two panels of a gate side-by-side as shown in FIG. 9.

Referring to FIG. 11 in conjunction with FIGS. 3 and 9, an exemplary embodiment of a connection means for rigidly connecting adjacent panels 10', 10" is depicted. The lateral side 35 of panel 10" comprises a seal plate 47 and the adjacent lateral side 35' of panel 10' comprises a seal plate 47'. Drilled and tapped structural angle members 48, 48' are affixed respectively to seal plates 47, 47'. A pressure plate 49 backing the angle members 48, 48' is fastened to angle members 48, 48' by countersunk bolts 50, 50'. Angle members 48, 48' are also drilled distally from seal plates 47, 47' to receive bolts 51, 51' holding a topside pressure plate 52 to angle members 48, 48'. A gasket 53 is sandwiched between topside pressure plate 52 and angle members 48, 48' secured by topside pressure plate 52 and bolts 51, 51'.

Figure 12:
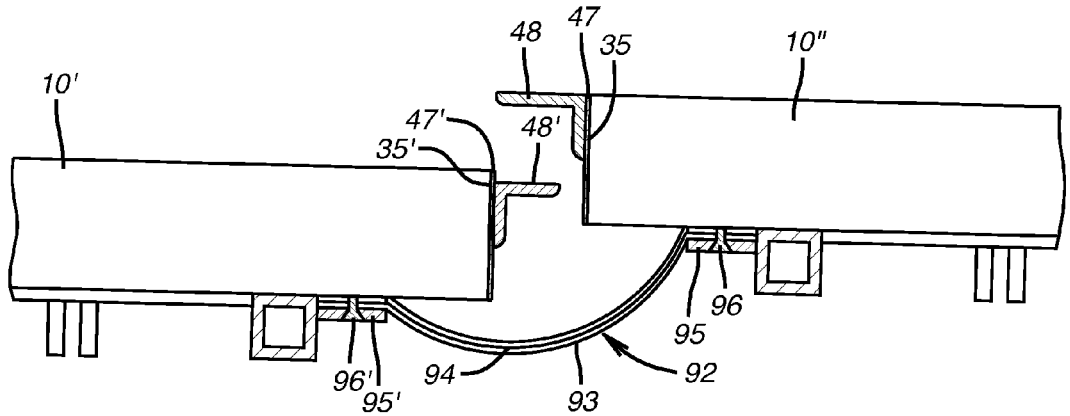
FIG. 12 is a similar view to FIG. 11 showing an alternative means of connecting two panels of a gate side-by-side.

Referring to FIG. 12, an exemplary embodiment of means for flexibly connecting adjacent panels gate units, in this case units 10 and 10', is shown. As before, the lateral side 35 of panel 10" comprises a seal plate 47 and the adjacent lateral side 35' of panel 10' comprises a seal plate 47'. A lateral side 35 of each gate unit, e.g., unit 10" next adjacent another gate unit in the series, e.g., unit 10', is connected to the lateral side 35' of that next adjacent gate unit (e.g. unit 10') by a water impervious flexible web 92 preventing passage of water between the sides of the flexibly connected adjacent units (e.g., units 10', 10"). Web 92 comprises a gasket 93, suitably 3/16 inch thick containing a glass rod fill 94 for maintaining gasket profile. Web 92 is sandwiched between drilled and tapped pressure plate members 95, 95' that attach to gate units 10" and 10' by countersunk bolts 96, 96'. The flexible connection of adjacent gate units allows the units potentially to elevate responsive to water heights in front of them that may be different due to a change in seawall elevation along the length of the connected gate units.

Further referring to FIG. 12, an L-shaped flange 47 having a length the same as the height of a gate unit to which it is attached is fillet welded by a vertical (as viewed with the gate unit recumbent) leg 47' to the lateral side 35' of gate unit 10'. Another L-shaped flange 47 also having a length the same as the height of a gate unit to which it is attached is fillet welded by a vertical (as viewed with the gate unit recumbent) leg 47 to the lateral side 35 of gate unit 35. The horizontal arms 48 of flanges 47 are longer than the horizontal arms 48' of flanges 47' of the next left adjacent gate unit. The longer horizontal arms 48 overlay the shorter horizontal arms 48' when the adjacent gate units are both recumbent in pan 20, occluding the gap between adjacent gate units. As the intermediate gate units rise under influence of water buoyancy and hydrostatic pressure, the tops of the horizontal arms 48' of flanges 47' contact with the underside of the horizontal arms 48 of flanges 47 in the next adjacent more erect gate unit, reinforcing the erect stature of the next adjacent more erect gate unit and providing a metal to metal seal supplementing the seal provided by web 92.

Figure 13:
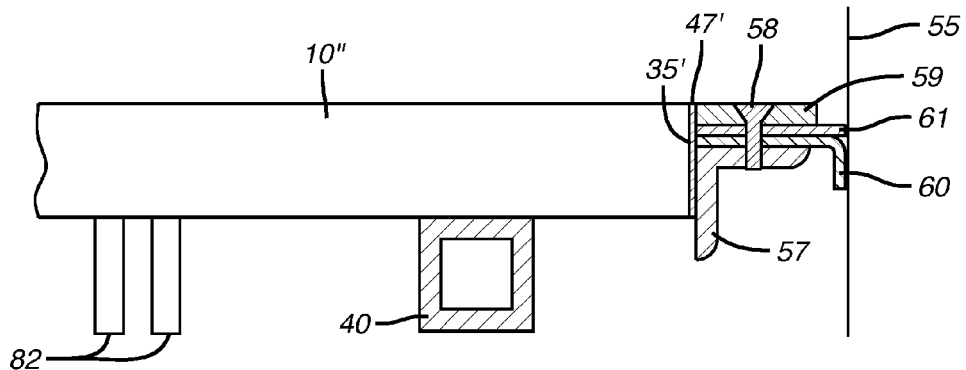
FIG. 13 is an end sectional view taken along the line 12-12 of FIG. 3 of an exemplary seal for the lateral sides of an exemplary embodiment of a gate for a construction of this invention.

In an exemplary embodiment, the distance spacing between wiper walls 7, 7' is a width sufficient to provide a gap between each lateral side of the gate unit and the adjacent wiper wall suitable for accommodation of a flexible seal gasket for sealing the gap. Reference numerals 56, 56' indicate seals along the lateral outsides 35, 35' of gate 10 for contacting wiper walls 7, 7' to restrain passage of water between the sides 35 of gate unit 10 and wiper walls 7, 7' as gate 10 rotates upwardly from pan 20. Referring to FIGS. 9 and 13, an exemplary embodiment of seals 56, 56' is shown in which the seals comprise flexible lip seals. The lateral side 35' of panel 10' comprises a seal plate 47' as earlier described. Drilled structural angle member 57 is affixed to seal plate 47'. Secured by bolts 58 holding down and passing through pressure plate 59 into angle member 57 is a lip seal 60 backed by a gasket 61 under pressure plate 59. Lip seal 60 and gasket 61 sealingly contact wiper wall 55 or 55' during movement of gate 10 upward along the pivotation axis described below and hold the seal when gate 10 is upright.

Although the lateral walls 5, 5' and 6 in the embodiments depicted include wiper walls 7, 7' and lip seal gaskets 60, 61, these may be omitted. With a gate unit 10 fully raised and refusing storm surge water without the presence of wiper walls 7, 7' and lip seal gaskets 60, 61 wiping and sealing wiper walls 7, 7', a slight vertical slice of water could pass at each lateral edge of a multi-panel gate unit 10 as opposed to the very large horizontal mass of water refused by gate 10. Depending on the overall width of gate 10, the reduction in the amount of storm surge water prevented by gate 10 from flooding the shore behind gate 10 is many orders of magnitude greater than the small slice of water passing through the margins at the sides 35, 35' of the multi-panel gate units 10 adjacent the lateral end walls 5, 5' and intermediate end walls 6. For protection of the shore side of gate 10, such "leakage" at the margins of the of the multi-panel gate units 10 is trivial compared to the protection gained against the large mass of water blocked by gate 10. Thus, if wiper walls 7, 7' or lip seals 60, 61 are omitted or if lip seals 60, 61 are present in the absence or presence of wiper walls 7, 7' but degrade over time, most property guarded by gate 10 would be sufficiently protected.

Referring to FIGS. 1, 3, 6-8, and particularly to FIG. 14, construction 1 includes a plurality of pivotation members 62 comprising a stationary member 63 connected to the back end 23 of pan 20 and a moveable member 64 moveably joined to stationary member 41. Moveable member 64 is connected to the back end 34 of gate 10 and is pivotable about a pin 66 concentric with horizontal axis 65 normal to said wiper walls 7, 7' to allow gate unit 10 to rotate upwardly from pan 20 away from parapet 4, initially buoyantly elevating on rising water admitted into pan 20 through entrance 38 at the upwardly open fore end 37 of pan 20 and impounded between the underside 32 of gate 10, parapet 4 and wiper walls 7, 7'.

Referring to FIGS. 1, 3, and 7-8, construction 1 further comprises a flexible strip gasket 67 across the pivotation members 62 along the back end 34 of gate unit 10 and the back end 23 of pan 20 to prevent passage of water between back end 23 of pan 20 and back end 34 of gate unit 10.

Figure 7:
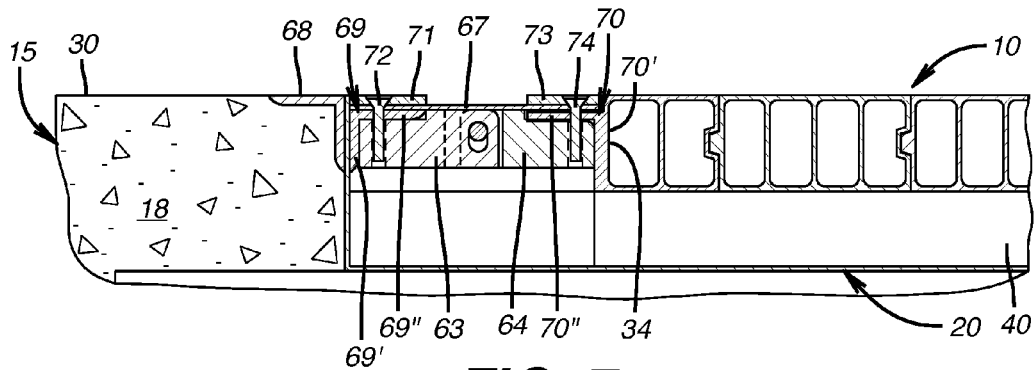
FIG. 7 is a side sectional view taken along the line 7-7 of FIG. 3 showing the pivotation members of FIG. 14 attached to the pan of FIG. 4 and the gate panel of FIG. 5, with the gate horizontally disposed in the pan.

Referring particularly to FIGS. 7-8, a horizontal L-shaped flange 68 is attached to foundation 15. The top outside of the back end 23 of pan 20 is fillet welded to foundation flange 68. A first L-shaped flange 69 having a length the same as the width of gate unit 10 is fillet welded by a vertical leg 69' to the top inside of the back end 23 of pan 20. A second L-shaped flange 70 also having a length the same as the width of gate unit 10 is fillet welded at second flange vertical leg 70' to the top of the back end 34 of gate 10.

Flexible strip gasket 67 is disposed over the horizontal legs 69", 70" respectively of, and along the length of, L-shaped flange members 69, 70. A first flat pressure plate 71 having the same length as the width of gate unit 10 is arranged over strip gasket 67 longitudinally atop horizontal leg 69" of flange 69. Threaded fasteners 72 pass consecutively through drilled passages in first flat pressure plate 71, strip gasket 67, and horizontal leg 69" of first L-shaped flange 69, thence into one of a plurality of drilled and tapped stationary pivotation member 63, to fasten strip 67 and stationary pivotation member(s) 63 to horizontal leg 69" of first L-shaped flange 69, thereby securing strip 67 and stationary pivotation member 63 to vertical L-shaped frame member 69' welded to pan 20.

A second flat pressure plate 73 having the same length as the width of gate unit 10 is arranged over gasket strip 67 longitudinally atop horizontal leg 70" of L-shaped flange 70. Threaded fasteners 74 pass consecutively through passages in second flat pressure plate 73, strip 67, and horizontal leg 70" of second L-shaped flange 70, thence into a drilled and tapped movable pivotation member 64, to attach moveable pivotation member 64 to horizontal leg 70" of second L-shaped flange 70 and secure strip 67 and moveable pivotation member(s) 64 to horizontal leg 70" and thereby securing strip 67 and moveable pivotation member 64 to vertical L-shaped frame member 70' welded to gate 10. Moveable pivotation member 64 moveably joined to stationary member 63 is pivotable about horizontal axis 65.

One or more restraints act on gate unit 10 limiting upward rotation of the gate unit to a substantially vertical position at which underside 32 of the gate unit faces parapet 4. The restraints may be as simple as horizontal arms attached to vertical posts anchored in foundations 17 or 18 or both at the back end 23 of pan 20 (not shown), and such a restraint is within the scope of the invention. Referring to FIGS. 1, and 5-8, in the exemplary embodiment depicted, the restraints take the form of retention arms 75 normally in a folded position when gate unit 10 is disposed in pan 20 and unfoldable on rising of gate unit 10 from pan 20 to straighten out and exert tension on gate unit 10 resisting the horizontal hydrostatic forces of storm surge water overtopping parapet 4 and bearing against gate unit 10.

At one end, arms 75 are each attached to a gate anchor mount 76, and at the other end, are attached to a pan anchor mount 77 attached to bottom 21 of pan 20. An exemplary embodiment of a gate anchor mount 76 is shown in FIG. 15, and an exemplary embodiment of a pan anchor mount 77 is shown in FIG. 16. Gate anchor mount 76 comprises a pair of ears 78 accepting a retaining pin 79 in holes in the ears transverse to the ears and aligned in a horizontal axis parallel to axis 65. The distal or gate end 80 of retention arm 75 pivots about retaining pin 79. Ears 78 are supported on a horizontal plate 81 welded about its perimeter to the underside 32 of gate unit 10 between adjacent gate support beams 40, 40'. Referring to FIGS. 9, 11, a plurality of ears 78 are seen along the length of the underside 32 of gate unit 10 for pivoting mount of the gate end 80 of retention arms 75.

Referring to FIG. 16, the pan anchor mount 77 is shown, comprising a two pairs of ears 82, 82' rising from a base plate 83. Base plate 83 is attached to pan 20 by anchor bolts 19 that pass through bolt holes 84 and bottom 21 of pan 20 to anchor in lower concrete slab 17 and upper concrete slab 18 of concrete foundation 15.

Accordingly, the exemplary embodiments of the invention illustrate a novel method and construction to achieve a low cost solution, not requiring human intervention or electrical power, to prevent storm surge overtopping of existing bulkheads, seawalls, levees, dikes or other water barriers and flooding the shore guarded by the water barrier. This is done by trapping overtopping wave water and impounding it to a height effective for buoyancy and hydrostatic pressure to rotationally erect a normally horizontal buoyant gate about an axis generally parallel to the water barrier in advance of a storm surge.

The above disclosed subject matter is to be considered illustrative, and not restrictive, and the appended claims are intended to cover all modifications, enhancements, and other embodiments that fall within the true scope of the present invention, which to the maximum extent allowed by law, is to be determined by the broadest permissible interpretation of the following claims and their equivalents, unrestricted or limited by the foregoing detailed descriptions of exemplary embodiments of the invention.

The invention claimed is:

1. A construction for protecting a shore side of a shore line water barrier wall from flooding from a storm surge overtopping the barrier wall, comprising:
   a water trap arranged above ground at the shore side of the barrier wall and comprising an above ground front wall having a height and above ground later walls connecting the front wall, the front wall being contiguous with the barrier wall, for entrapping storm water overtopping said front wall to form a pool,
   at least one normally horizontally buoyant gate or gate unit recessed below grade inside the water trap and spaced from said front wall sufficiently to allow formation of the pool between the gate or gate unit and the front wall, the gate or each gate unit comprising later sides, an underside face and a length spanning form an end distal to said barrier wall to an end proximal to said barrier wall and greater than the height of the front wall, the gate or each gate unit being rotatingly pivotable from horizontal to a full upright position about an axis at said distal end generally parallel to the barrier wall,
   at least two of said above ground lateral walls being proximately adjacent the side of the gate or each gate unit and having a height at least as tall as the height of the front wall, said front wall in concert with the lateral walls serving to impound storm water overtopping the front wall to a pool depth sufficient to produce a hydrostatic pressure, impressible on the underside face of the gate or each gate unit after the gate or gate unit is rotatingly buoyed partially upward from horizontal by water accumulating in the water trap, effective to rotate the gate or gate unit to a fully upright position.

2. The construction of claim 1 in which two of the lateral walls comprise end walls having a height about as tall as the length of the gate unit for preventing storm surge water higher than the height of the front wall from flowing around the lateral sides of the gate comprising at least one upright gate unit.

3. The construction of claim 2 comprising a plurality of gate units arranged in longitudinal series interspersed between lateral walls, wherein at least one intermediate lateral wall is located between said lateral end walls, at least one of the plurality of gate units is located between one lateral end wall and a next adjacent intermediate lateral wall, and at least one other gate unit of the plurality of gate units is located between the other lateral end wall and a next adjacent intermediate lateral wall.

4. The construction of claim 3 comprising a plurality of intermediate lateral walls, at least one of the plurality of gate units being located between adjacent intermediate lateral walls.

5. The construction of claim 3 in which each said intermediate lateral wall has a height about as tall as the length of at least one of the plurality of gate units at least at a place on the intermediate lateral wall adjacent to where the at least one of the plurality of gate units is in full upright position, for preventing storm surge water higher than the height of the front wall from passing through adjacent gate units.

6. The construction of claim 1 in which said lateral walls comprise a support wall and at least one wiper wall fastened on at least one lateral side of said support wall, said wiper wall being next adjacent a lateral side of the gate or gate unit.

7. The construction of claim 1 in which said front wall of the water trap has a height above shore grade at the barrier wall of from about ⅓ to about ½ the length of the gate unit.

8. The construction of claim 1 in which said gate unit comprises a plurality of panels connected side-by-side.

9. The construction of claim 8 in which said plurality of panels are rigidly connected.

10. The construction of claim 8 in which the said plurality of panels are flexibly connected.

11. A construction for protecting a shore side of a shore line water barrier wall from flooding from a storm surge overtopping the barrier wall, comprising
   a parapet atop the barrier wall,
   a pan adjacent the parapet and having a top edge at grade on the shore side of said barrier wall and a bottom below said grade,
   at least one buoyant gate or gate unit vertically taller than the parapet, normally horizontally resident in said pan, having lateral sides and a front face on an underside thereof, and rotatingly pivotable from horizontal to a full upright position about an axis at an end thereof distal to said barrier wall, said axis being generally parallel to the barrier wall,
   one or more restraints acting on the at least one gate or gate unit limiting upward rotation of the at least one gate or gate unit to a substantially vertical position with the underside of the at least one gate or gate unit facing the parapet
   a plurality of lateral walls connected to said parapet having a height at least as tall as the parapet, at least two of the lateral walls being proximately adjacent the sides of the at least one gate or each gate unit,
   said parapet having a height combining at least with the lateral walls to impound storm water overtopping the parapet to a depth sufficient to produce a hydrostatic pressure, impressible on the face of the at least one gate or gate unit after the at least one gate or gate unit is rotatingly buoyed partially upward from horizontal by water in the pan, effective to rotate the at least one gate or gate unit to a fully upright position, two lateral walls comprising end walls having a height about as tall as the at least one gate or gate unit for preventing storm surge water higher than the height of the parapet from flowing around the lateral sides of an upright gate comprising the at least one gate unit.

12. The construction of claim 11 comprising a plurality of gate units arranged in longitudinal series interspersed between lateral walls, wherein at least one of the plurality gate units is located between one lateral end wall and a next adjacent intermediate lateral wall, at least one other gate unit of the plurality of gate units is located between the other lateral end wall and a next adjacent intermediate lateral wall, and at least one other gate unit of the plurality of gate units is located between adjacent intermediate lateral walls, and wherein each intermediate lateral wall has a height about as tall as the length of at least one of the plurality of gate units at least at a place on the intermediate lateral wall adjacent to where at least one of the plurality of gate units is in full upright position, for preventing storm surge water higher than the height of the front wall from passing through adjacent gate units.

13. The construction of claim 12 in which one or more of the plurality of gate units comprise a plurality of panels connected side-by-side.

14. The construction of claim 12 in which said front wall of the water trap has a height above shore grade at the barrier wall of from about ⅓ to about ½ the length of the gate unit.

15. The construction of claim 13 in which said lateral walls comprise a support wall and at least one wiper wall fastened on at least one lateral side of said support wall, each said wiper wall being next adjacent a lateral side of one of the plurality of gate units.

16. The construction of claim 15 further comprising a seal along said lateral side of said one of the plurality of gate units for contacting said lateral wall adjacent said one of the plurality of gate units to restrain passage of water between said lateral side of one of the plurality of gate units and said lateral wall as said one of the plurality of gate units rotates upwardly.

17. The construction of claim 16 in which said seal comprises a flexible lip seal for sealingly wiping said wall and sealing a gap between said lateral side of said one of the plurality of gate units and the wiper wall to prevent passage of water through said gap.

18. The construction of claim 17 further comprising a flexible strip gasket across pivotation members along a back end of the plurality of gate units to prevent passage of water between the pan and the back end of the plurality of gate units.

19. A method for protecting a shore side of a shore line barrier wall from flooding from a storm surge overtopping the barrier wall, comprising:

providing adjacent the barrier wall a normally horizontal buoyant gate rotatingly pivoting at a base end thereof distal from the barrier about an axis generally parallel to the barrier, and trapping water overtopping said barrier wall and impounding the water above ground between the gate and the barrier wall to a depth producing a hydrostatic force against the gate effective to rotate the gate from a partially elevated position to an upright position.

20. A method of protecting a shore side of a shore line barrier wall from flooding from a storm surge overtopping the barrier wall, comprising providing a parapet atop the barrier wall, a buoyant gate unit taller than the parapet, said gate unit being normally resident below grade on the shore side of the barrier wall, hinged about an axis generally parallel to the barrier wall, and spaced from the parapet by a distance not less than the height of the gate unit, and further providing above-ground walls laterally adjacent sides of the gate unit, impounding above ground storm water overtopping the parapet between the parapet and walls laterally adjacent sides of the gate unit to rotationally float the gate unit from the horizontal position initially principally under a force of buoyancy pressure and then principally under a force of hydrostatic pressure to drive the gate unit to an upright position to oppose a storm surge water level higher than the parapet.

\* \* \* \* \*